(12) United States Patent
Kachline

(10) Patent No.: US 10,265,867 B2
(45) Date of Patent: Apr. 23, 2019

(54) ROBOTIC ACCESSORY MOUNTING ASSEMBLY

(71) Applicant: Lincoln Global, Inc., City of Industry, CA (US)

(72) Inventor: Jeffrey Kachline, Highland Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1210 days.

(21) Appl. No.: 14/032,795

(22) Filed: Sep. 20, 2013

(65) Prior Publication Data
US 2014/0374399 A1 Dec. 25, 2014

Related U.S. Application Data

(60) Provisional application No. 61/837,365, filed on Jun. 20, 2013.

(51) Int. Cl.
| | |
|---|---|
| *B23K 9/32* | (2006.01) |
| *B25J 19/00* | (2006.01) |
| *B23K 37/02* | (2006.01) |

(52) U.S. Cl.
CPC ........... *B25J 19/00* (2013.01); *B23K 37/0241* (2013.01)

(58) Field of Classification Search
CPC .... B25J 15/0019; B25J 19/0029; B25J 19/00; Y10S 901/28; Y10S 901/41; Y10S 901/30; Y10S 901/49; B23K 9/32; B23K 37/02; B23K 37/0241; H01R 9/11; H01R 13/639; H01R 31/06

USPC .............. 219/137.9; 901/41, 42; 439/13, 439/293–295, 289, 271; 239/273–283
See application file for complete search history.

(56) References Cited

U.S. PATENT DOCUMENTS

| | | | | |
|---|---|---|---|---|
| 4,549,068 A | * | 10/1985 | Kensrue | B23K 9/323 219/137.31 |
| 5,941,679 A | * | 8/1999 | Foti | B25J 15/0019 414/737 |
| 5,954,446 A | * | 9/1999 | Ireland | B23K 9/32 403/11 |
| 6,712,618 B2 | * | 3/2004 | Welch | H01R 39/646 439/13 |
| 7,854,615 B1 | * | 12/2010 | Kachline | B23K 9/29 174/15.7 |
| 8,584,547 B2 | * | 11/2013 | Sirkett | B25J 19/0091 403/223 |
| 8,642,888 B2 | * | 2/2014 | Karlinger | B25J 19/0029 174/70 R |
| 8,845,338 B2 | * | 9/2014 | Sirkett | B25J 19/0029 439/15 |

(Continued)

*Primary Examiner* — Chee-Chong Lee

(57) ABSTRACT

A robotic accessory mounting assembly used in connection with a robot to attach an accessory to the robot, the mounting assembly including a cable connected to an implement mounted on the robot; the cable having a cable length; the implement including a first component having a first length, wherein the implement with the first component has an implement length that corresponds to the cable length; and a second component adapted to replace the first component, the second component having a length less than the first component, wherein replacement of the first component with the second component reduces the implement length defining a clearance relative to the cable length to receive an accessory mount in-line with the implement.

20 Claims, 8 Drawing Sheets

(56) References Cited

U.S. PATENT DOCUMENTS

| | | | | |
|---|---|---|---|---|
| 8,992,113 B2* | 3/2015 | Campagna | ............... | B25J 15/04 |
| | | | | 403/349 |
| 2008/0146064 A1* | 6/2008 | Bankstahl | ................ | B23K 9/32 |
| | | | | 439/332 |
| 2008/0188093 A1* | 8/2008 | Jaeger | .................... | H01R 35/04 |
| | | | | 439/13 |
| 2008/0236324 A1* | 10/2008 | Inoue | ....................... | B25J 9/046 |
| | | | | 74/490.02 |
| 2011/0114617 A1* | 5/2011 | Gelmetti | ............. | B23K 9/1336 |
| | | | | 219/137.9 |

* cited by examiner

STANDARD

.25" ACCESSORY MOUNT

.50" ACCESSORY MOUNT

ROBOTIC ACCESSORY MOUNTING ASSEMBLY

This U.S. patent application claims priority to and the benefit of U.S. provisional patent application Ser. No. 61/837,365 filed on Jun. 20, 2013, which is incorporated herein by reference in its entirety.

TECHNICAL FIELD

The present invention generally relates to a robotic welding system and more particularly to a robotic accessory mounting assembly for a welding system.

SUMMARY OF THE INVENTION

The invention generally provides a robotic accessory mounting assembly used in connection with a robot to attach an accessory to the robot, the mounting assembly including a cable connected to an implement mounted on the robot; the cable having a cable length; the implement including a first component having a first length, wherein the implement with the first component has an implement length that corresponds to the cable length; and a second component adapted to replace the first component, the second component having a length less than the first component, wherein replacement of the first component with the second component reduces the implement length defining a clearance relative to the cable length to receive an accessory mount in-line with the implement.

The invention further provides a robotic accessory mounting assembly for attaching an accessory having an accessory mount to the robot in line with an implement, the robotic accessory mount including a component attachable to the implement in a first configuration having a first length corresponding to a length of a cable extending from the robot and connected to the implement and a second configuration having a second length less than the first length defining a clearance for receipt of the accessory mount.

The invention further provides a robot accessory mounting assembly for attaching for attaching an accessory to a robot, the robot accessory mounting assembly including an implement having a component supported on an end of the robot and having a power cable extending there-along; and means for reducing the length of the component to provide a clearance relative to the cable for receiving the accessory in line with the implement.

BRIEF DESCRIPTION OF THE DRAWINGS

The following description and the annexed drawings set forth in detail certain illustrated aspects of the claimed subject matter. These aspects illustrate, however, but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION OF THE INVENTION

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth.

Figure 1:
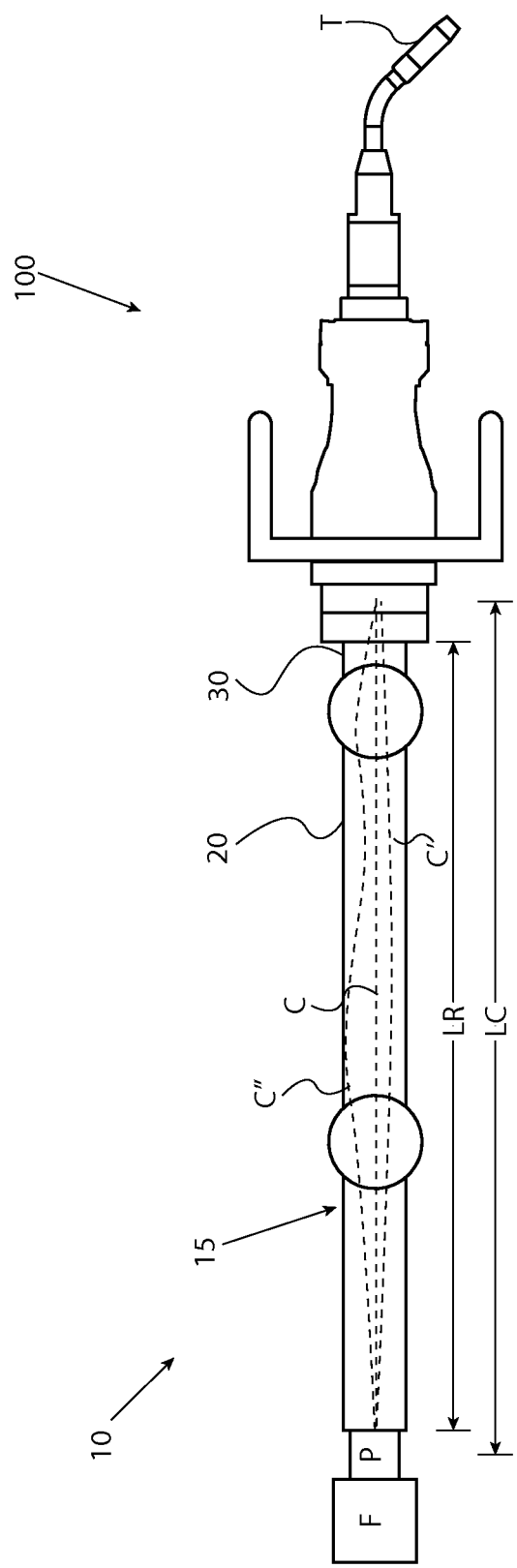
FIG. 1 is a partially sectioned schematic side elevational view of a welding system according to the invention showing a robotic manipulator in a fully extended position.
Figure 2:
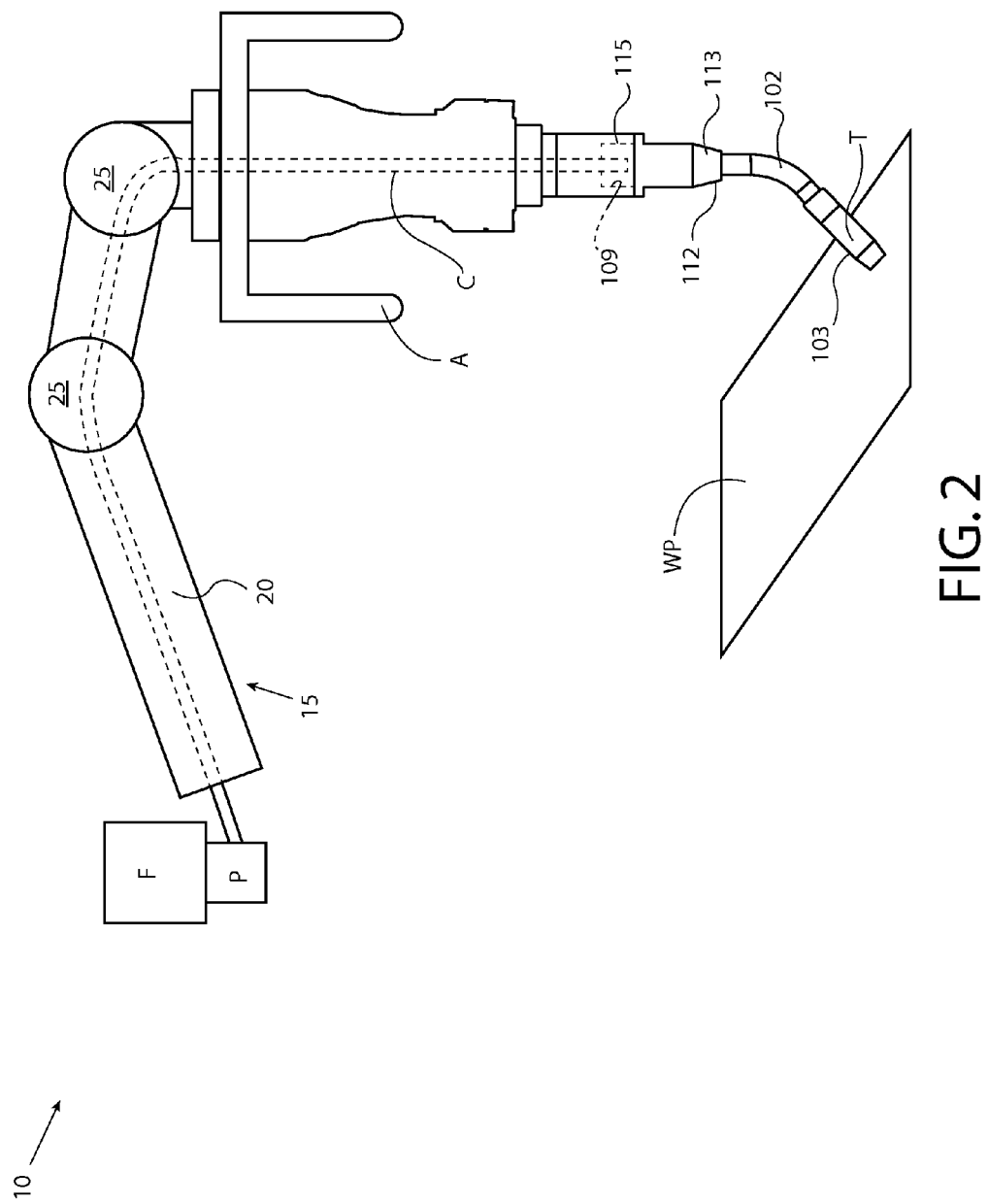
FIG. 2 is a schematic side elevational view similar to FIG. 1 showing the robotic manipulator in an articulated position with an accessory mounted according to the invention.
Figure 5:
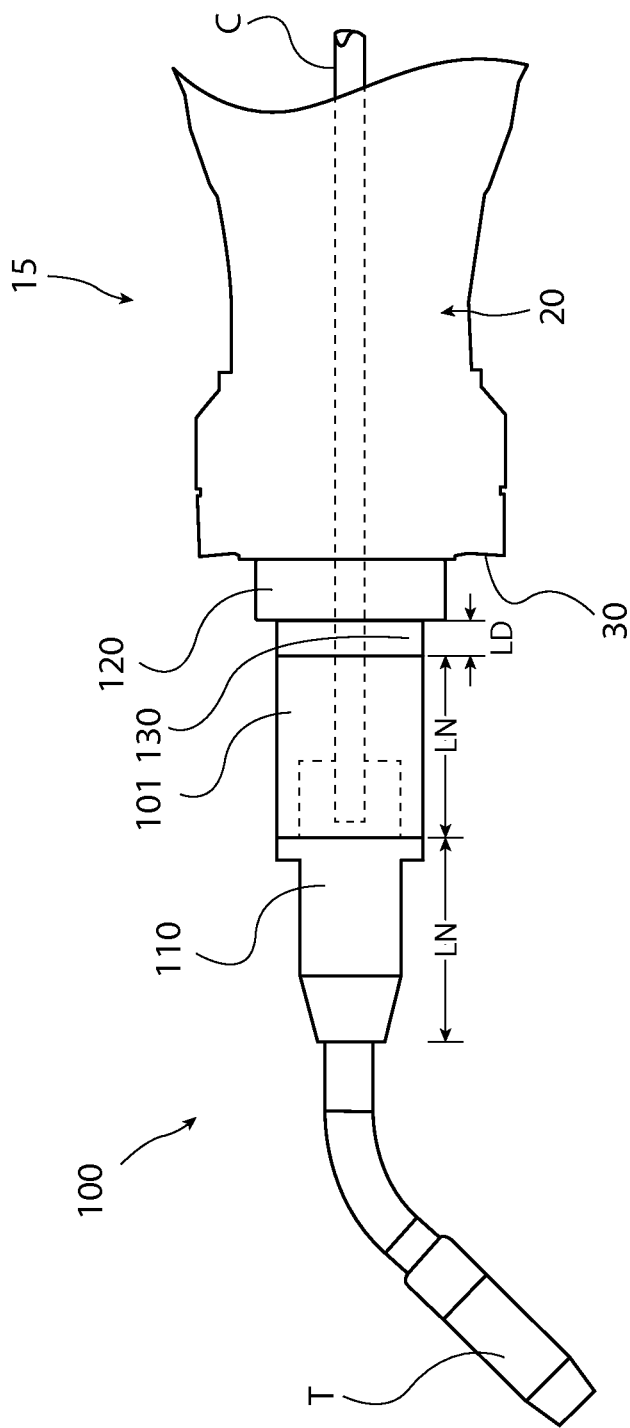
FIG. 5 is a side elevational view of a welding system according to the invention having an implement that includes a spacer.

A welding system according to the invention is generally indicated by the number 10 in the drawings. Welding system 10 incorporates a robot 15. Robot 15 is any system for manipulating the position of the welding torch or simply torch T relative to a workpiece WP and may take on a variety of forms. In the example shown, robot R includes an manipulator 20 having one or more joints 25 (FIG. 2) that permit articulation of the manipulator 10. As best seen in FIGS. 1 and 2, torch T may be mounted at the outer extremity of manipulator 10. Power is provided from a power source P to torch T via a cable C. To permit movement of torch T there is some slack in cable C, as schematically illustrated in FIG. 1. The amount of slack is somewhat exaggerated in the drawing to show the bowing of the cable C as the manipulator is moved up and down (positions C' and C" respectively). As described more completely below, the cable length and the slack provided are held to a tolerance to prevent premature wear of the cable. The cable length is typically predetermined based on the length of the robot and the implement being attached. In the example of a welding system, the implement is a welding torch T. The welding torch T is part of a torch assembly that may include a housing 101, a nose 110 and a disk 120. As best seen in FIG. 1, the cable C may attach at nose 110 to provide power to torch T. As a result, the length of cable C includes the lengths of the disk $L_D$, housing $L_H$ and at least a portion of nose $L_N$ (FIG. 5). The length $L_C$ (FIG. 1) of cable C is standardized so that the cable C may be produced in quantity and adhere to the tolerance necessary to prevent premature wear of the cable C. Using a standard length also facilitates support of the device over its life. For example, a replacement cable may be readily ordered.

It may be desirable to add an accessory. The need to add an accessory, however, may vary depending on the customers, and often the decision to add an accessory is made by the customer without consulting the manufacturer of the welding system. The type of accessory also may vary based on a particular customer's needs. The examples of accessories discussed herein, therefore, should not be considered limiting. Example accessories include but are not limited to vision systems and material handling tools.

When the accessory is attached in-line with the robot manipulator and implement, its thickness effectively increases the length of the manipulator and implement. Since the cable C is not designed to accommodate the additional length $L_A$ of the accessory, the cable is too short and does not have sufficient slack to accommodate movement of the implement. As a result, the robot may be bind or the cable may wear or fail prematurely. Providing a custom length cable in such instances is one possible solution. Alternatively according to the present invention, a longer standard cable may be produced. This allows production of the longer cable in quantity to facilitate good cable tolerances and to provide a ready supply of replacement cables. This also aids in continued support of the welding system. For example, when a service technician may not be aware of any accessories added to the system, whether a custom cable had previously been used, or other circumstances that would cause the service technician to order the wrong sized cable.

Figure 6:
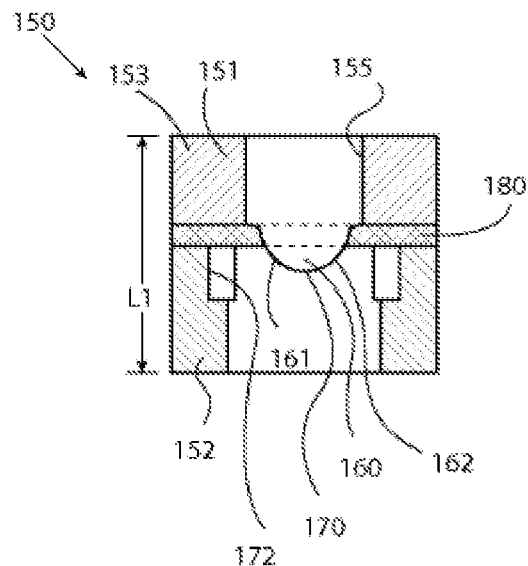
FIG. 6 is a sectioned side elevational view of a component according to the invention having two halves that are moveable relative to each other to adjust the length of the component, where the component is configured to have a first length.

To accommodate a longer standard cable and to allow accessories to be added, the length of the implement is adjusted. To add an accessory in-line with the implement, the length of the implement must be reduced to accommodate the length of the accessory at the point of attachment. The embodiments depicted show three approaches to adjusting the implement length. The embodiments shown in FIG. 3 adjust the length by providing a substitute disk(s) used to attach the implement housing to the robot having a shorter length than the disk installed match the longer standard cable length. FIG. 4 shows the length of the housing adjusted. FIG. 5 shows a spacer that may be added to increase the effective length of implement to match the longer stand and cable length. The spacer may be removed or replaced with a thinner spacer to provide clearance for attachment of an accessory. FIG. 6 shows a disk/spacer having adjustable length. Each embodiment will be described more completely below. These embodiments are not limiting as other configurations according to the concepts of the invention will be apparent to one of ordinary skill in view of the teachings provided herein.

With reference to FIGS. 1 and 2, one example of a welding system 10 according to the invention will be described in more detail. Welding system 10 includes a robot 15 and an implement 100 attached to the robot 15. In the example shown, robot 15 includes a manipulator 20. Manipulator 20 may be an arm having one or more joints 25. It will be appreciated that other types of manipulators may be used. Also, manipulator 20 may have any number of joints or degrees of freedom depending on the particular application. Therefore, the example shown is not limiting in terms of the manipulator's configuration. Implement 100 is shown mounted on the end 30 of manipulator 20. The implement 100 may be attached to manipulator 20 in any known manner including but not limited to mechanical fasteners, such as, threaded fasteners, pins, or clamps. Implement 100 in the example shown is a welding torch. It will be appreciated that implement 100 may be another powered tool including but not limited to a water jet, plasma cutter, oxy fuel torch, machining tool, laser and the like.

In general, implement 100 defines at least one passage 105 that receives the power cable C. Passage 105 may also receive wire from a feeder F and/or shielding gas depending on the type of welding performed by welding system 10. Passage 105 may also accommodate sensor wires or other conduits required by the welding system. Alternatively, additional passages may be defined within implement 100.

The passage 105 may be formed completely within the interior of implement 100, as shown, or be formed by a recessed surface on implement or a surface projecting outward from implement 100. Implement 100 includes one or more components which define the implement length. As best shown in FIG. 2, the implement length $L_I$ is the length of the implement 100 from its inner end 108 to the point where the cable C terminates. In the example shown, the components defining the implement length are a housing 101 and a disk 120 described more completely below. Greater or fewer components may make up implement 100 depending on the application and type of implement used. For example, in some instances, cable C may extend beyond housing 101 and into nose 110.

As discussed more completely below, to accommodate a longer standard cable C, the components define a first length that corresponds to the cable length $L_C$. Likewise, one or more of the components of the implement 100 can be shortened to provide a clearance for an accessory A. To attach the accessory A in-line with the implement, the accessory A may be attached to the end 30 of manipulator 20 or to a component within implement 100.

Figure 9:
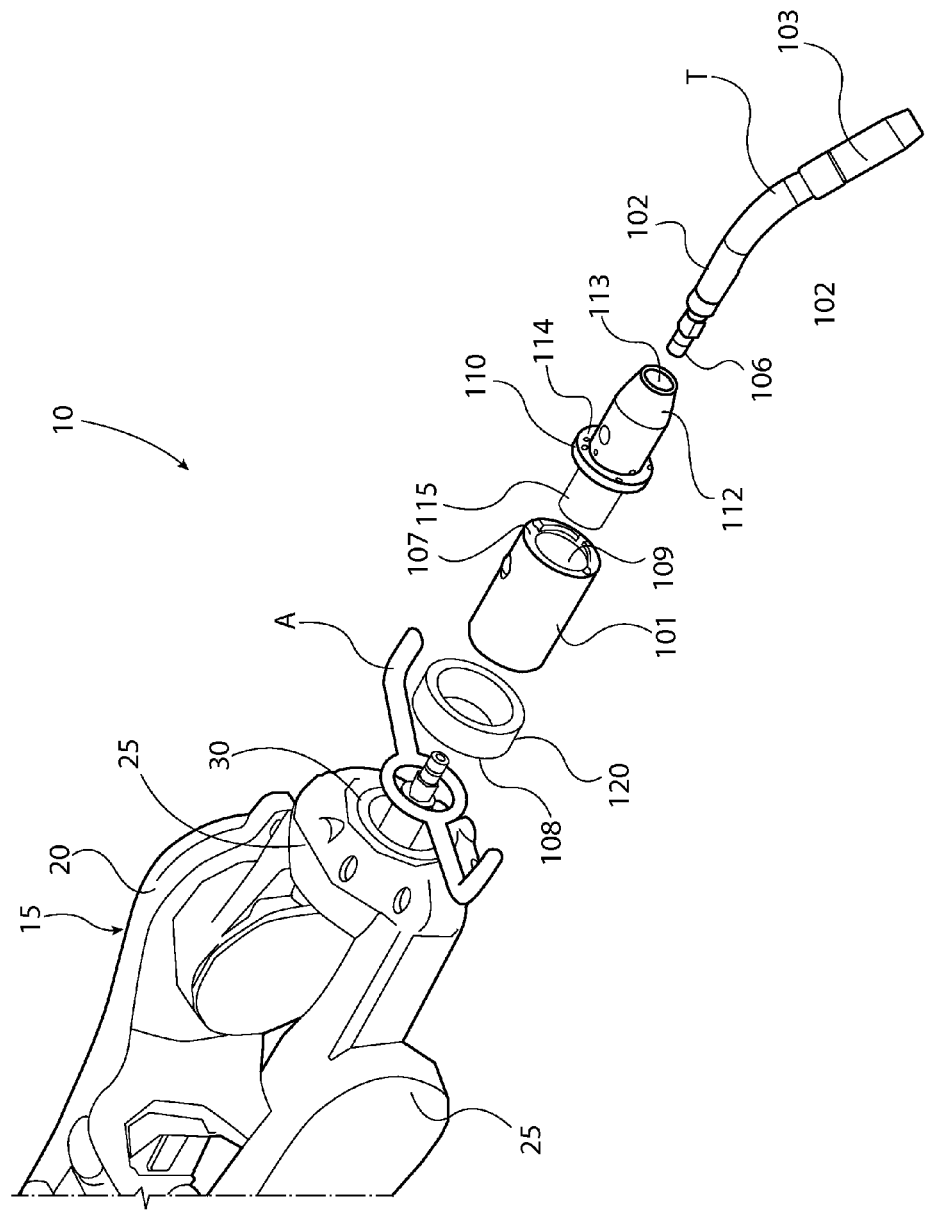
FIG. 9 is a perspective view of a welding system according to the invention exploded to show details of the assembly of the components of the welding torch implement.

In the example depicted in the figures, implement is a welding torch. As best shown in FIGS. 2 and 9, the welding torch includes a goose neck 102 that extends outward from housing 101 and terminates in a torch tip 103. The goose neck 102 may be attached to nose 110 that is supported on housing 101. In the example shown, nose 110 includes a cone 112 having an internally threaded bore 113 that receives a threaded end 106 of goose neck 102. Nose 110 may further include a flange 114 that abuts and covers the outer surface 107 of housing 101. Receivers may be provided in flange 114 to receive fasteners that extend through flange 114 and fasten the nose to housing 101. A shank portion 115 may extend axially inward from flange 114 to be received within housing 101. As best shown in FIG. 2, passage 105 may include a countersunk portion 109 that accommodates a shank portion 115 having a larger diameter than the remainder of the passage 105.

Cable C may be electrically connected to housing 101, which in turn is electrically connected to torch T by way of the nose 110. To that end, housing 101 and nose 110 may be constructed of a conductive material, for example, aluminum, copper or brass. It will be appreciated that electrical connection of the cable C to torch T may be achieved in other manners such that housing 101 and nose 110 may be constructed of non-conductive materials such that any material may be used.

An insulator may be provided between housing 101 and end 30 of manipulator 20 to electrically separate the torch T from manipulator 20. In addition, a buffer may be provided to protect the end 30 of manipulator 20 from impacts to the implement 100. The buffer may be made of a material that will absorb the impact, crush, or breakaway to reduce the likelihood of damage to the manipulator 20. In the example shown, the buffer is a disk 120. While the disk shown has a circular shape, this shape is not limiting. The disk 120 may have any shape. The disk also may be constructed of any suitable material or configuration to allow it to absorb an impact, crush, or breakaway to reduce the likelihood of damage to the manipulator 20, housing 101 or torch T. In the example shown, the disk 120 is designed to breakaway and is constructed of a material that is not as strong as housing 101. Optionally, as shown, disk 120 may be constructed of an insulative material, and serve as an insulator and a buffer. In the example shown, the disk is constructed of nylon to act as an insulator and a buffer. This example is not limiting as other materials may be used to serve both purposes including but not limited to other wood, other pulp products, rubber, other elastomeric materials, ceramics, glass, foam, plastics, other polymer materials, and combinations thereof.

Other polymer materials may include but are not limited to thermoplastics, thermosets, terpolymers, and/or polymers. Polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethyl pentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA.

Thermoplastic polymers may also include styrenic polymers, such as polystyrene, poly-(p-methylstyrene), poly (.alpha.-methylstyrene), copolymers of styrene, p-methylstyrene or alpha-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or alpha-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures on the styrenic copolymers indicated above.

Nitrile polymers are also useful. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, such as acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane]terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with poly-olefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

Figure 3:
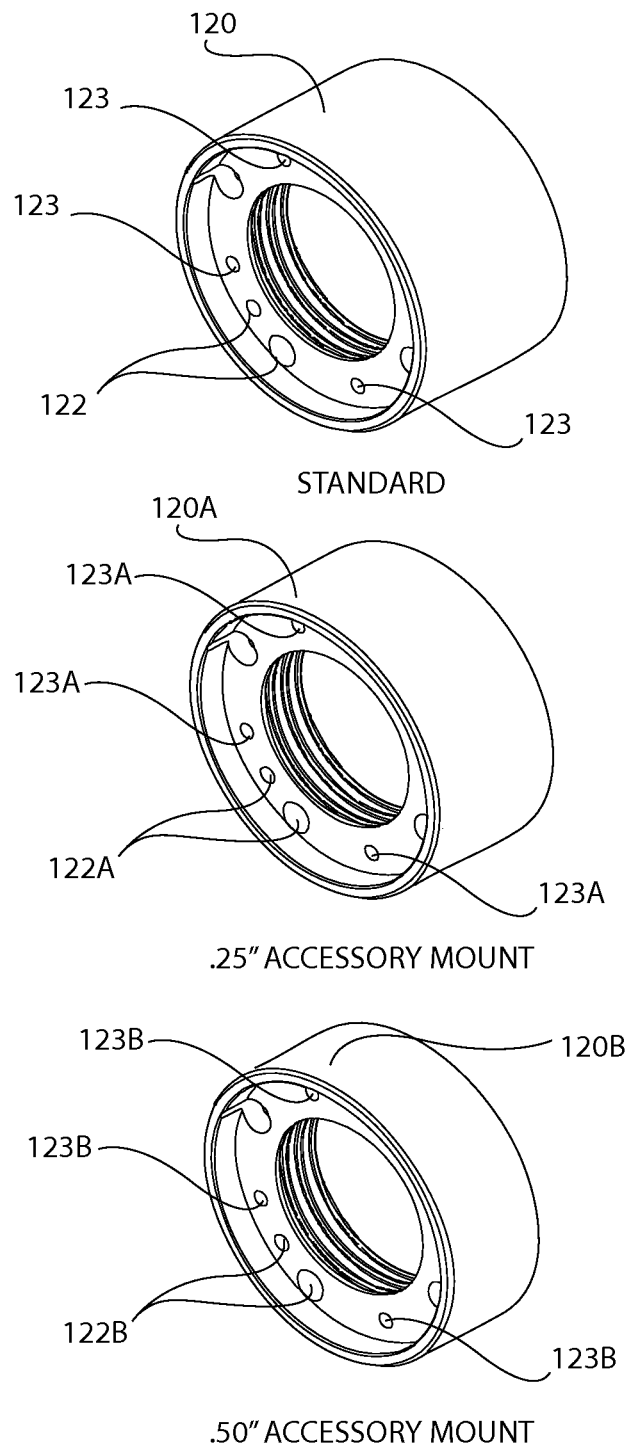
FIG. 3 is a perspective view of an accessory mounting disks according to the invention.
Figure 4:
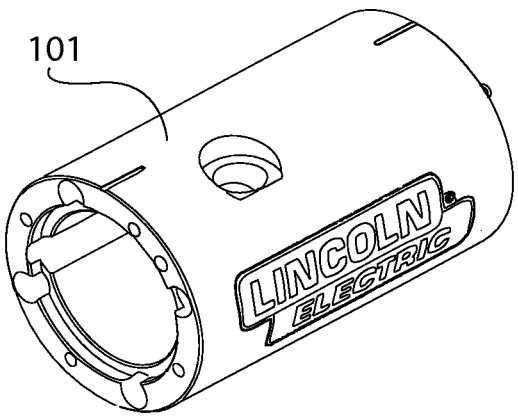
FIG. 4 is a perspective view of accessory mounting housings according to the invention.
Figure 4:
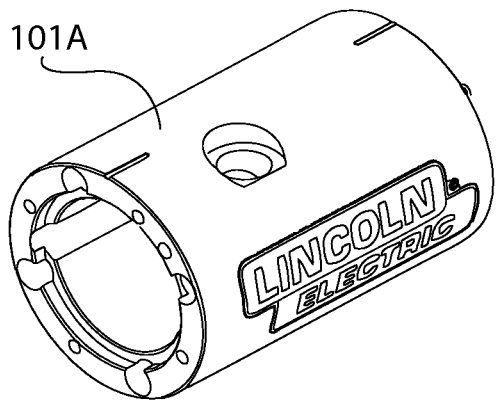
Figure 4:
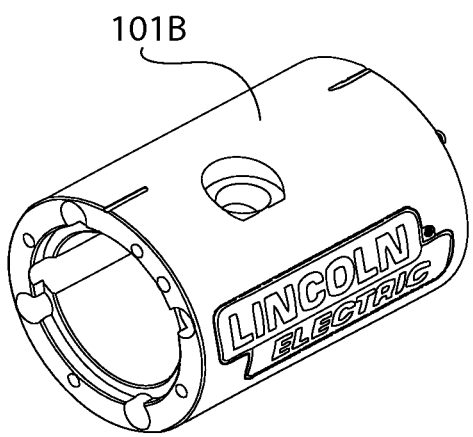

As best seen in FIG. 3, disk 120 may define receivers 122 used to facilitate fastening of the disk 120 to housing 101. Additional receivers may be provided on the inner side of disk 120 to attach disk 120 to end 30 of manipulator 20. In the example shown, housing 101 is bolted to the outer side of disk 120 and the inner side of disk 120 is bolted to manipulator 20. The bolts are separated by material from the disk 120 so that the housing is insulated from the manipulator 20. Additional receivers 123, shown, may receive pins used to locate and clock the housing 101 relative to disk 120. The type of attachment shown between housing and disk and disk and manipulator is not limiting as other forms of attachment known to those of ordinary skill may be used within the scope of the invention.

According to one embodiment of the invention, to adjust the length of implement 100 to accommodate in-line attachment of an accessory A, the length of disk 120 is adjusted. With reference to FIG. 3, a standard disk 120 is provided for a welding system 10 where no accessory has been attached. In this system, with the manipulator 20 fully extended, the cable C has a length approximately equal to the sum of the length of the robot $L_R$, the disk $L_D$, the housing $L_H$, and the length. As discussed, the length of the cable C will be slightly longer than the sum of the parts through which it runs to provide slack that accommodates movement of the robot and torch. In the example shown, the additional length is about 150 thousandths of an inch. The tolerance on the length of cable C may be about 200 thousandths of an inch. These examples are not limiting as different slack allowances and tolerances may be used depending on the amount of movement of the robot and the particular application.

With respect to the disk, a standard disk 120 has a preselected length corresponding to the length of housing 101 and nose 110 being attached to robot 15 and the overall length of cable C with allowance for any slack. To provide clearance for the mounting of an accessory, a disk having a shorter length than the standard length disk may be substituted for the standard length disk. For example, disk 120A is 0.25 inch shorter than standard disk 120 providing 0.25 inch clearance for an accessory mount. Disk 120B is 0.50 inch shorter than disk 120 providing a 0.50 inch clearance for an accessory mount.

The standard disk and/or replacement disk having a length less than the standard housing may be sold as a kit. For example, an accessory mounting kit for a robotic welding system may include at least one disk having a length less than the standard disk. The at least one disk would be adapted to replace the standard disk and define an accessory mount clearance relative to the length of the cable. The kit may include one or more additional disks having a length different than a first disk in the kit to provide a different clearance than the first disk. For example, a kit may include a first disk having a first length and a second disk having a second length, where the first disk is 0.25 inch shorter than a standard disk, and the second disk is 0.25 inch shorter than the first disk. It will be appreciated that larger and smaller increments may be used. To facilitate retrofitting to existing systems, the kit may include a replacement cable that is longer than the cable in the welding system being retrofitted a standard disk having a length that corresponds to the length of the replacement cable, and at least one replacement disk having a length less than the standard disk to define a clearance for mounting an accessory.

While the implement described herein is a welding implement, it will be appreciated the concepts of the invention may be applied to non-welding applications where a cable provides power to the implement attached to a robot, and an accessory is attached in line with the implement.

Figure 11:
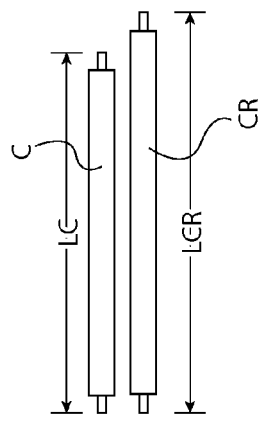
FIG. 11 is a side view comparing a standard cable length to a replacement cable length in accordance with the invention.

According to another embodiment of the invention, to adjust the length of implement 100 to accommodate in-line attachment of an accessory A, the length of housing 101 is adjusted. With reference to FIG. 4, a standard housing 101 is provided for a welding system 10 where no accessory has been attached. In this system, with the manipulator 20 fully extended, the cable C has a length approximately equal to the sum of the length of the robot $L_R$, the disk $L_H$, the housing $L_H$, and the length. As discussed, the length of the cable C will be slightly longer than the sum of the parts through which it runs to provide slack that accommodates movement of the robot and torch. The standard housing and/or replacement housings having a length less than the standard housing may be sold as a kit. For example, an accessory mounting kit for a robotic welding system may include at least one housing having a length less than the standard housing. The at least one housing would be adapted to replace the standard housing and define an accessory mount clearance relative to the length of the cable. The kit may include one or more additional housings having a length different than a first housing in the kit to provide a different clearance than the first housing. For example, a kit may include a first housing having a first length and a second housing having a second length, where the first housing is 0.25 inch shorter than a standard housing, and the second housing is 0.25 inch shorter than the first housing. It will be appreciated that larger and smaller increments may be used. To facilitate retrofitting to existing systems, the kit may include a replacement cable $C_R$ (FIG. 11) that is longer than the cable C in the welding system being retrofitted a standard housing having a length that corresponds to the length of the replacement cable $L_{CR}$, and at least one replacement housing, such as for example replacement housings (101A or 101B) shown in FIG. 4, having a length less than the standard housing 101 to define a clearance for mounting an accessory.

With respect to the housing 101, a standard housing 101 has a preselected length corresponding to the length of the disk and nose 110 being attached to robot 15 and the overall length of cable C with allowance for any slack. It is anticipated that in some configurations, the nose or disk may be omitted based on the torch design and the attachment of the torch. In these instances the length of the housing may be greater to account for the omitted item(s) or the cable length $L_C$ may be shorter.

To provide clearance for the mounting of an accessory, a housing having a shorter length than the standard length housing may be substituted for the standard length housing 101. For example, housing 101A is 0.25 inch shorter than standard housing 101 providing 0.25 inch clearance for an accessory mount. Housing 101B is 0.50 inch shorter than housing 101 providing a 0.50 inch clearance for an accessory mount.

In accordance with another embodiment of the invention, rather than adjusting the length of the housing 101 or disk 120, a spacer 130 may be provided to increase the effective length of implement 100 to correspond to the longer standard cable C. This embodiment may be useful for customers wishing to retrofit existing systems with the longer standard cable C. In such instances, a spacer 130 may be created with a length corresponding to the difference in the length of cable C less the length of the portions of the implement 100 through which the cable runs. In the example shown in FIG. 5, cable C passes exits the manipulator 20 of robot 15 and passes through a disk 120, housing 101 and spacer 130. To provide clearance for attachment of an accessory, a thinner spacer may be substituted or the spacer may be removed. The spacer in the example shown in FIG. 5 has a length of about 0.50 inch. Removing this spacer 130 would provide a 0.50 inch clearance for mounting an accessory. Alternatively, a spacer having a length of 0.25 inch could be substituted for spacer 130 to provide a 0.25 inch clearance for mounting an accessory. It will be appreciated that a spacer 130 of greater or shorter length may be initially provided based on the length of the standard cable. Likewise, the length of substitute spacers may be any length shorter than the initial spacer to provide the appropriate clearance based on the length of the portion of the accessory attached in line with the implement 100. The lengths discussed herein are examples only, and are not limiting.

The standard spacer and/or replacement spacers having a length less than the standard spacer may be sold as a kit. For example, an accessory mounting kit for a robotic welding system may include at least one spacer having a length less than the standard spacer. The at least one spacer would be adapted to replace the standard spacer and define an accessory mount clearance relative to the length of the cable. The kit may include one or more additional spacers having a length different than a first spacer in the kit to provide a different clearance than the first spacer. For example, a kit may include a first spacer having a first length and a second spacer having a second length, where the first spacer is 0.25 inch shorter than a standard spacer, and the second spacer is 0.25 inch shorter than the first spacer. It will be appreciated that larger and smaller increments may be used. To facilitate retrofitting to existing systems, the kit may include a replacement cable that is longer than the cable in the welding system being retrofitted a standard spacer having a length that corresponds to the length of the replacement cable, and at least one replacement spacer having a length less than the standard spacer to define a clearance for mounting an accessory.

According to another embodiment of the invention, one or more components forming the implement 100 may have an adjustable length. For example, the spacer 101, nose 110, disk 120, or spacer 130 in the above examples may have an adjustable length. In this embodiment, the component would have a first length corresponding to the length of the cable C when no accessory is mounted in line with implement 100 and robot 15. The component could be configured to have a second length $L_2$ less than the first length $L_1$. One such component is generally indicated by the number 150 in FIG. 6. It will be understood that component 150 may be any component within implement 100 or a portion thereof. For purposes of illustration, the component 150, shown, is a disk as discussed in previous embodiments. According to the present embodiment, component 150 can be configured to have at least two lengths ($L_1, L_2$). Making component 150 extendable and retractable between the at least two lengths may be achieved by any known mechanism including but not limited to a cam, a telescoping body, and the like.

In the example shown, a cam assembly is used. Component 150 has a first half 151 and a second half 152. Both halves 151,152 define a central bore through which the cable C extends. As shown, the bore of each half 151, 152 may have a different dimension. Although not shown, the bore of each half may also have the same dimension. First half 151 has a first wall 153 that defines a first bore 155. Second half 152 has a second wall 154 that defines a second bore 156.

Figure 8:
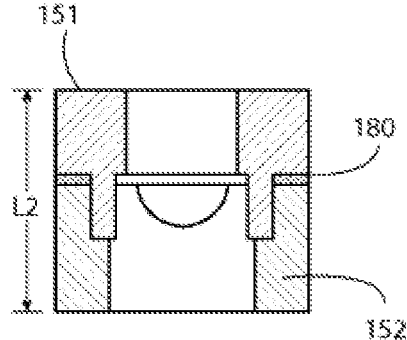
FIG. 8 is a sectioned side elevational view of the component shown in FIG. 6 configured to have a second length, which is less than the first length.

First wall 153 may include a projecting surface, which will be referred to as a tab, that extends toward the second half to space the first half and second half from each other. Use of the term tab is not limiting to any particular shape or number of projecting surfaces. In the example shown, a pair of tabs 160 extend toward second half 152. Tabs 160 may have sloped or rounded leading and trailing edges 161,162 to facilitate their rotation as discussed below. The tabs 160 shown each have the same shape and profile. In the section (FIG. 6), only one tab is visible. Second wall 154 defines a first receiver and a second receiver in which the tab 160 is at least partially inserted to positively locate the halves relative to each other. The first receiver and second receiver respectively may include a pair of first notches 170 and a pair of second notches 172. First and second notches generally have a profile corresponding to the profile of tab 160, where the first notches 170 are shallower than second notches 172. As a result, when tabs 160 reside in first notches 170 (FIG. 6), the first half 151 and second half 152 are spaced apart a maximum amount to define a first length $L_1$. First length $L_1$ corresponds to the length of implement 100 with no accessory attached and correspondingly the longer standard length cable C. Rotation of first half 151 relative to second half 152 from the position seen in FIG. 6, where the tabs 160 reside in first notches 170, to the position in FIG. 8, where the tabs 160 reside in second notches 172, reduces the length of component 150 to provide clearance for the attachment of an accessory. In the example shown, the clearance provided is about 0.25 inch. It will be appreciated that the difference in the depth of second notches relative to first notches 170 may be varied to achieve any desired clearance. Also, additional notches may be provided to provide more than two lengths.

Figure 7:
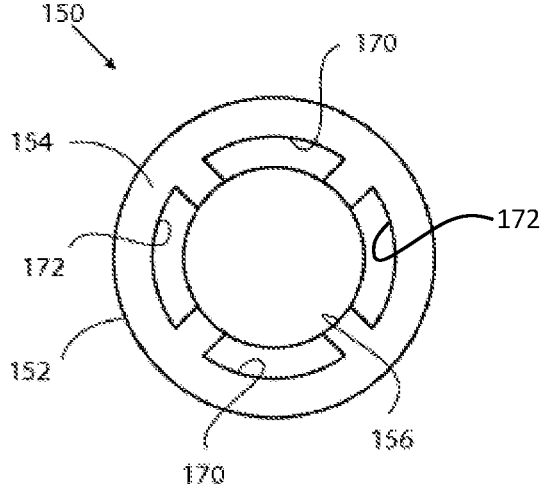
FIG. 7 is a top elevational view of one half of the component shown in FIG. 6.

As best shown in FIG. 7, both sets of notches 170, 172 may have individual notches that are diametrically opposed to form the pair. Based on the shape of the tabs 160, second notches have a greater radial dimension than first notches 170. It will be understood that with different notch configurations, this may not be necessary. For instance, a square tab 160 may be pulled out of first notch 170 before rotating it to be received within second notch 172. In terms of rotation, first notches 170 and second notches 172 may be spaced on center by 90 degrees, such that a 90 degree rotation is required to move from the first length to the second length. These positions are provided as examples and other positions may be used to increase or decrease the amount of rotation or provide additional positions. It also is possible to replace tabs with inclined surfaces or other that may increase or decrease the length of component 150 by rotation, and then lock the component at the desired length with an locking assembly including but not limited to a pin, clasp, or fastener.

As an option, to prevent material from entering the gap between halves 151,152 or the bore defined between halves 151,152, a flexible gasket or boot 180 may be provided between halves 151,152 to fill the gap created by the halves in the area surrounding tabs 160.

As in the previous embodiments, an adjustable length component 150 could be sold as part of a kit to retrofit existing welding systems. For example, an accessory mounting kit for a robotic assembly may include a replacement cable C that is longer than the existing cable and an adjustable length component 150 that would replace an existing component within the implement 100.

Likewise, as discussed above, to define a clearance to mount an accessory any component within the implement may be shortened. Therefore, an accessory mounting kit for a robotic assembly may include any component used in the implement having a shorter length than the standard component and a replacement cable that is sized to the length of the implement with the standard component. In addition, the kit may include different components that when combined provide a shorter implement length relative to the replacement cable. For example, a kit may include a replacement cable, a replacement disk and a replacement housing. The kit may also include a spacer that fills the clearance created by either or both of the replacement disk and replacement housing. In this way, the user may use the spacer to fill the clearance created by replacement disk and replacement housing when the accessory is not used.

Figure 10:
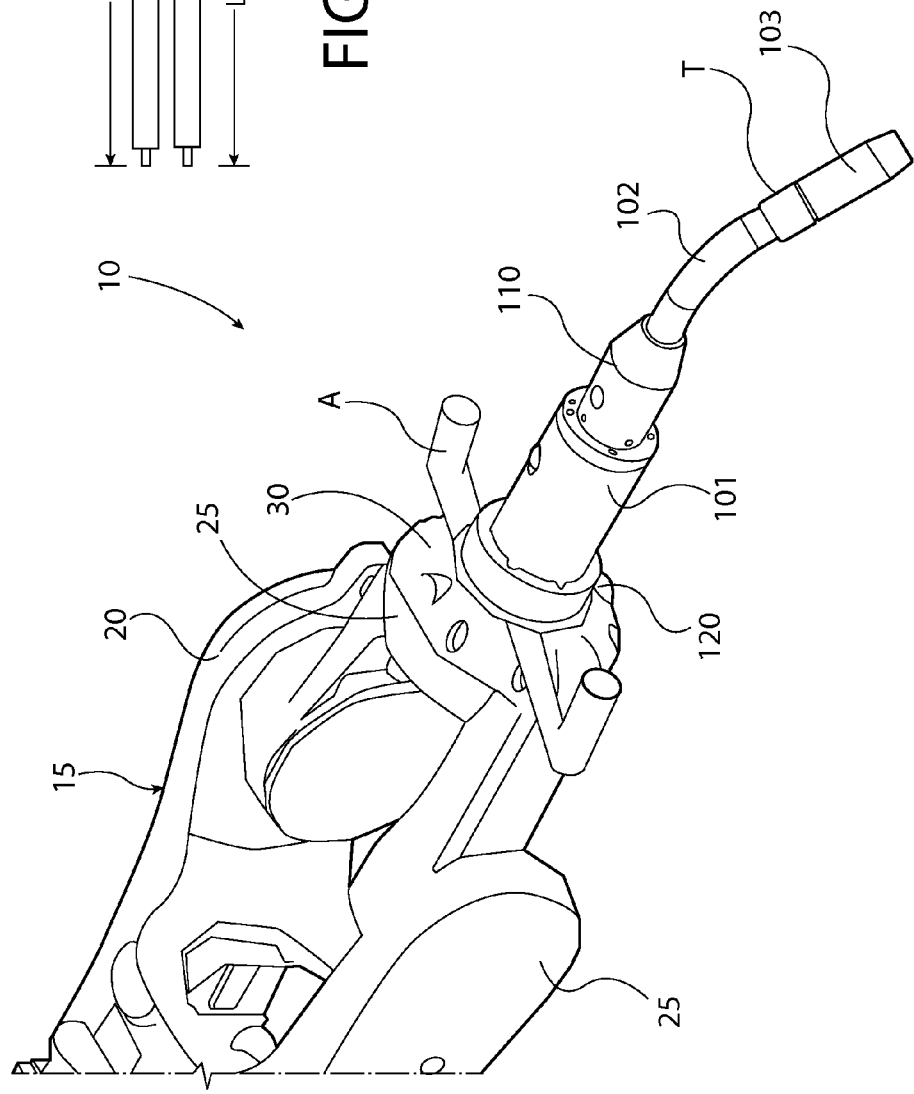
FIG. 10 is a perspective view similar to FIG. 9 showing the components assembled.

In accordance with another aspect of the invention shown in FIGS. 9 and 10, attachment of the accessory A is made at the end 30 of manipulator 20 and upstream of a break-away disk 120. As discussed, break-away disk 120 is designed to absorb impacts to the implement 100. Design considerations for choosing the material of the disk 120 and its configuration may be based on the load created by implement 100 and the forces generated by movement of implement 100 on manipulator 20. It will be appreciated that since the customer may select accessories themselves, attaching the accessory downstream or outward of the disk changes the loading from the original considerations for the disk. Depending on the size of the accessory its effect on the mass moment of inertia when combined with the implement, and the increased likelihood of contact between the accessory and the surroundings, placing the accessory downstream of the disk may lead to a premature failure or damage to the disk 120 or other components of the implement, which may be subjected to loading from the accessory or a resulting impact. In the example shown, accessory A is attached to end 30 of manipulator 20, and is located between manipulator 20 and disk 120. It will be appreciate that other positions upstream of disk 120 may be used. For example, intermediate components including spacers may be provided between the disk 120 and accessory A.

Various embodiments herein need not include the described and/or illustrated geometries. The cylindrical shaped disks, spacers, and spacers shown in the Figures and described herein merely suggest some possible embodiments that can be recognized under the disclosures herein. For example, various regular and irregular polygonal shapes, irregular shapes or custom shapes and cross-sections can be employed. Straight-line geometries can be employed in place of rounded portions and vice versa. Thus, while one or more particular embodiments have been described in detail, these details are not to be interpreted as exhaustive or exclusive.

While principles and modes of operation have been explained and illustrated with regard to particular embodiments, it must be understood that this may be practiced otherwise than as specifically explained and illustrated without departing from its spirit or scope.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A robotic welding system the system comprising:
a robot;
a cable;
an accessory:
an implement; and
a robotic accessory mounting assembly for attaching the accessory in line with the implement mounted on the robot with the cable, having a cable length, connectable to the implement,
wherein the robotic accessory mounting assembly includes:

a component configured such that the implement can be attached to the robot via the component, the component configured to be selectively switched between a first configuration and a second configuration, the first configuration having a first length and the second configuration having a second length less than the first length to provide a clearance for the accessory to be mounted in-line, wherein the second length with the accessory mounted in-line corresponds to the first length, wherein the component includes a first half and a second half, where the first half includes a tab extending toward the second half, and the second half defines a first receiver and a second receiver each adapted to at least partially receive the tab, where the first receiver has a first depth and the second receiver has a second depth less than the first depth, and wherein the first receiver and second receiver are spaced radially from each other, and wherein the first half is rotatable relative to the second half to move the tab from the first receiver to the second receiver.

2. The system of claim 1, wherein the implement is a welding torch and the cable is electrically connected to the welding torch.

3. The system of claim 1, wherein the implement includes a housing, the cable being connected to the housing, and wherein the component is a disk mounted between the housing and an end of the robot.

4. The system of claims 3, wherein the disk is constructed of a weaker material than the housing.

5. The system of claim 1, wherein the component is a housing.

6. The system of claim 1, wherein the component is a spacer.

7. The system of claim 1, wherein the clearance is defined between the implement and an end of the robot, and wherein the accessory is mounted to the end of the robot.

8. The system of claim 1, wherein the component is a breakaway disk, and wherein the accessory is mounted to an end of the robot, and wherein the breakaway disk is attached to the end of the robot outward of the accessory.

9. The system of claim 8, wherein the implement includes a welding torch supported on a housing, and wherein the housing attaches to the breakaway disk.

10. The system of claim 1, wherein the implement defines a central passage adapted to receive the cable.

11. A robotic welding system the system comprising:
a robot;
a cable;
an accessory:
an implement; and
a robotic accessory mounting assembly for attaching the accessory in line with the implement mounted on the robot with the cable, having a cable length, connectable to the implement, wherein the robotic accessory mounting assembly includes:

a component configured such that the implement can be attached to the robot via the component, the component configured to be selectively switched between a first configuration and a second configuration, the first configuration having a first length and the second configuration having a second length less than the first length to provide a clearance for the accessory to be mounted in-line, wherein the second length with the accessory mounted in-line corresponds to the first length, wherein the component includes a first half and a second half, where the first half includes a tab extending toward the second half, and the second half defines a first receiver and a second receiver each adapted to at least partially receive the tab, where the first receiver has a first depth and the second receiver has a second depth less than the first depth, and wherein the first half includes a second tab diametrically opposed from the first tab, and wherein the first receiver includes a pair of diametrically opposed notches and the second receiver includes a second pair of diametrically opposed notches.

12. The system of claim 11, wherein the implement is a welding torch and the cable is electrically connected to the welding torch.

13. The system of claim 11, wherein the implement includes a housing, the cable being connected to the housing, and wherein the component is a disk mounted between the housing and an end of the robot.

14. The system of claims 13, wherein the disk is constructed of a weaker material than the housing.

15. The system of claim 11, wherein the component is a housing.

16. The system of claim 11, wherein the component is a spacer.

17. The system of claim 11, wherein the clearance is defined between the implement and an end of the robot, and wherein the accessory is mounted to the end of the robot.

18. The system of claim 11, wherein the component is a breakaway disk, and wherein the accessory is mounted to an end of the robot, and wherein the breakaway disk is attached to the end of the robot outward of the accessory.

19. The system of claim 18, wherein the implement includes a welding torch supported on a housing, and wherein the housing attaches to the breakaway disk.

20. The system of claim 11, wherein the implement defines a central passage adapted to receive the cable.

* * * * *